(12) United States Patent
Copete Cano et al.

(10) Patent No.: US 11,170,915 B2
(45) Date of Patent: Nov. 9, 2021

(54) SUBSEA CABLE SYSTEM AND A METHOD FOR SUPPLYING ELECTRICAL POWER TO A SUBSEA DEVICE

(71) Applicant: NEXANS, Courbevoie (FR)

(72) Inventors: Carlos Copete Cano, Halden (NO); Jens Ludvig Larssen, Halden (NO)

(73) Assignee: NEXANS, Courbevoie (FR)

(*) Notice: Subject to any disclaimer, the term of this patent is extended or adjusted under 35 U.S.C. 154(b) by 0 days.

(21) Appl. No.: 16/172,129

(22) Filed: Oct. 26, 2018

(65) Prior Publication Data
US 2019/0164666 A1 May 30, 2019

(30) Foreign Application Priority Data
Oct. 31, 2017 (FR) ................. 17 306 498.1

(51) Int. Cl.
*H01B 9/00* (2006.01)
*H01B 7/02* (2006.01)
(Continued)

(52) U.S. Cl.
CPC ............ *H01B 9/006* (2013.01); *F16L 1/15* (2013.01); *F16L 53/37* (2018.01); *F16L 53/38* (2018.01);
(Continued)

(58) Field of Classification Search
CPC .......... H01B 7/14; H01B 7/045; H01B 7/046; H01B 9/006; F16L 53/38; F16L 53/37
See application file for complete search history.

(56) References Cited

U.S. PATENT DOCUMENTS 5,577,926 A 11/1996 Cox
6,417,457 B1* 7/2002 Aasbo ............ H01B 7/184
174/120 R
(Continued)

FOREIGN PATENT DOCUMENTS

WO 2010135772 12/2010

OTHER PUBLICATIONS

SWCC Showa Holdings Co., LTD: "Cable Joint", Dec. 31, 2016 (Dec. 31, 2016). Retrieved from the Internet: URL:http://www.swcc.co.jp/eng/products/siconex/cable joint.html [retrieved-on May 4, 2018].
(Continued)

*Primary Examiner* — Timothy J Thompson
*Assistant Examiner* — Amol H Patel
(74) *Attorney, Agent, or Firm* — Sofer & Haroun, LLP (57) ABSTRACT

A subsea cable system (10) for transfer of electric power to a subsea device is disclosed where the subsea cable system comprises a subsea cable (11) with a first end portion (26) and a second end portion (27). The first end portion (26) is adapted for connection to a supply of electrical energy. The subsea cable (11) comprises at least a first supply cable (21), a second supply cable (22) and at least one return cable (24, 25) where the first supply cable (21), the second supply cable (22) and the at least one return cable (24, 25) each comprises a conductor element (101, 102, 103, 104) for conduction of an electric current. The subsea cable system (10) further comprises a conductor transition element (66) comprising a conductor element (67) that is provided with at least a first conductor leg (73), a second conductor leg (74) and a third conductor leg (75). The first conductor leg (73) is connected to the conductor element (101) of the first supply cable (21), the second conductor leg (74) is connected to the conductor element (102) of the second supply (Continued)

cable (22) and the third conductor leg (75) is connected to conductor element (56) of an end supply cable (53) that is connectable to a consumer device (46). A method for supplying electrical power to a subsea consumer device of electricity is also disclosed.

16 Claims, 8 Drawing Sheets

(51) Int. Cl.
      *H01B 3/44*     (2006.01)
      *H02G 9/12*     (2006.01)
      *H01B 7/14*     (2006.01)
      *H01R 11/28*     (2006.01)
      *H01R 11/01*     (2006.01)
      *H01R 11/32*     (2006.01)
      *H01R 11/09*     (2006.01)
      *F16L 1/15*     (2006.01)
      *F16L 53/38*     (2018.01)
      *F16L 53/37*     (2018.01)
      *E21B 41/00*     (2006.01)
(52) U.S. Cl.
    CPC ........... *H01B 3/441* (2013.01); *H01B 7/0216* (2013.01); *H01B 7/14* (2013.01); *H01R 11/01* (2013.01); *H01R 11/09* (2013.01); *H01R 11/28* (2013.01); *H01R 11/32* (2013.01); *H02G 9/12* (2013.01); *E21B 41/0007* (2013.01)

(56) References Cited

U.S. PATENT DOCUMENTS

| | | |
|---|---|---|
| 2004/0108125 A1 | 6/2004 | Thomassen |
| 2006/0193572 A1* | 8/2006 | Mjelstad ............. G02B 6/4427 |
| | | 385/101 |
| 2007/0098375 A1 | 5/2007 | Kinnari et al. |

OTHER PUBLICATIONS

Nexans: "Subsea Technology", 3•1 Jan. 2008 (Jan. 31, 2008), XP002779690, Retrieved from the Internet: URL:http://www.nexans.no/Norway/2008/0152 NEX Brosj Subsea folder.pdf—[retrieved on Mar. 29, 2018].
European Search Report dated May 4, 2018.
Etelec: "Submarine Cast Resin Joints", Sep. 30, 2017 (Sep. 30, 2017), XP055713886, Retrieved from the Internet URL:http://www.etelec.com/en/wp-contenVuploads/sites/18/2017/09/CatEN2017 Etelec_SUBMARINE_branch.pdf.
International Search Report dated Mar. 23, 2021.

* cited by examiner

SUBSEA CABLE SYSTEM AND A METHOD FOR SUPPLYING ELECTRICAL POWER TO A SUBSEA DEVICE

RELATED APPLICATION

This application claims the benefit of priority from European Patent Application No. 17 306 498.1, filed on Oct. 31, 2017, the entirety of which is incorporated in reference.

BACKGROUND

Field of the Invention

The present invention relates to a subsea cable system and a method for supplying electrical power to a subsea consumer device of electricity for MV (medium voltage) and HV (high voltage) applications subsea. In particular, the cable system may be used for transfer of electric power from the top side of a floating structure to a subsea device or structure that consumes electrical power.

Description of Related Art

Offshore drilling and production of hydrocarbons are taking place at gradually increasing depths. Providing supply of electrical energy to various subsea consumers of electrical energy is therefore also becoming more challenging as the depths where drilling and production of hydrocarbons are taking place is commonly reaching large depths and ultra large depths, i.e. typically water depths exceeding 1000 m and 3000 m for large water depths and ultra-large waters depths respectively.

In offshore production of hydrocarbons, subsea pipes and pipelines are used to transport produced hydrocarbons, often over long distances. Due to low temperatures in the sea water, formation of wax and hydrates in the pipeline is a problem. To avoid formation of wax and hydrates, the fluids flowing in a subsea pipeline may be injected with different types of chemicals. Another known way to prevent wax and hydrates formation in a pipeline is to use DEH (Direct Electric Heating) of the pipeline to ensure that the temperature of the fluids in the pipeline are kept above temperatures where there is a risk for wax and hydrate formation. In direct electrical heating of a pipeline or a section of a pipeline, electrical power may be supplied to one end of the pipeline or the end of the section of the pipeline being heated, usually through a piggy back cable arranged on the pipeline or the section of the pipeline being heated, then using the pipeline itself as a resistive heating element to provide the heat energy needed to keep the temperature of the fluids in the pipeline above the temperatures where there is a risk for wax and hydrate formation.

There are also other types of subsea equipment used during drilling and production of hydrocarbons that needs a supply of electrical energy. Valve devices, pipelines and other types of subsea equipment that are commonly placed on the bottom of the sea, may need supply of electrical energy from outside.

To provide the electric power to heat the pipeline or other types of subsea equipment from outside or to provide electric power for operation of subsea equipment such as valve devices, a coaxial subsea cable is commonly provided where the subsea cable is connected to a source of electrical energy on the topside structure that is typically a platform, an FPSO (Floating Production, Storage and Offloading) unit or a similar structure. In a coaxial cable the conductor conducting the electric current from the topside structure down to the subsea devices and the conductor conducting the electric current back to the topside structure are arranged coaxially within the subsea cable. A challenge with such subsea power cables in deep waters and ultradeep waters is the high topside tension that is caused by the weight of the subsea cable itself and thereby the risk of overloading the conductors of the subsea cable.

OBJECTS AND SUMMARY

An object of the present invention is therefore to provide a subsea cable system that is capable of supplying electric power to a subsea consumer device arranged at a large or ultra large depth.

A further objective is to provide electric power to heat a subsea pipeline by direct electric heating where the pipeline is located at a large or ultra large depth.

It has further been an objective of the present invention to provide a subsea cable system where the weight of a subsea cable extending down into large and ultra large depths is managed so that the electrical conductors of the subsea cable are not damaged.

These objectives are solved by the subsea cable system as defined in claim 1, the method for supplying electrical power to a subsea consumer device of electricity as defined in claim 13 and a use of the subsea cable system as defined in claim 15. Further preferred embodiments of the present invention are defined in the dependent claims.

Hence, there is provided a subsea cable system for transfer of electric power to a subsea device. The subsea cable system comprises a subsea cable, for example a subsea riser cable, with a first end portion and a second end portion where the first end portion is adapted for connection to a supply of electrical energy. The subsea cable comprises at least a first supply cable, a second supply cable and at least one return cable. The first supply cable, the second supply cable and the at least one return cable each comprises a conductor element for conduction of an electric current. The subsea cable system further comprises a conductor transition element comprising a conductor element that is provided with at least a first conductor leg, a second conductor leg and a third conductor leg where the first conductor leg is connected to the conductor element of the first supply cable, the second conductor leg is connected to the conductor element of the second supply cable and the third conductor leg is connectable to a subsea consumer device.

With this design of the subsea cable system, the first supply cable and the second supply cable are thereby combined into a single end supply cable that provides electrical power to the subsea consumer device.

The third conductor leg of the conductor transition element may be connected to the subsea consumer device in various ways. For example, the third conductor leg of the conductor transition element may be directly connected to the subsea consumer device. Alternatively, the third conductor leg of the conductor transition element may be connected to a conductor element of an end supply cable that is further connected to the subsea consumer device. The claimed invention therefore solves the problems mentioned above by employing a subsea cable that does not comprise coaxially arranged electrical conductors. Instead, the subsea cable is provided with two or more separate conductors, i.e. the conductors of the supply cables, that conduct the electrical current from a source of electrical power, usually arranged on a topside structure such as a platform or an FPSO-unit, down to a subsea consumer of electrical energy, and at least one, but preferably two or more separate conductors, i.e. the conductor of the at least one return cable, that conduct the electrical current back to the topside structure. Furthermore, the claimed invention includes a conductor transition element that will merge the plurality of supply cables/conductors into a single conductor before the electrical current is supplied to the subsea consumer device, for example a pipeline or a section of a pipeline that needs to be heated, where the electrical current is possibly carried to a second end portion of the pipeline or the section of the pipeline to be heated through a piggy back cable.

The conductor transition element that combines the two phases of the electrical supply current, i.e. the first supply cable and the second supply cable, may be given different types of shapes, but preferably the conductor transition element is generally Y-shaped or T-shaped. The conductor transition element thereby comprises a first leg that includes the first conductor leg, a second leg that includes the second conductor leg and a third leg that includes the third conductor leg. The conductor transition element is preferably provided with an insulation system comprising at least an inner layer, an outer layer and an insulation layer that is arranged between the inner layer and the outer layer.

The inner layer is preferably made of a semi-conducting material. The semi-conducting material may be, for example, EPR (ethylene-propylene rubber).

The insulation layer is preferably made of cured, cross linked polyethylene.

The outer layer is preferably also made of a semi-conducting material. Again, the semi-conducting material may be, for example, EPR (ethylene-propylene rubber).

The first leg of the conductor transition element is preferably provided with a first connector device for connection of the first supply cable to the first leg.

The second leg of the conductor transition element is preferably provided with a second connector device for connection of the second supply cable to the second leg.

The third leg of the conductor transition element is preferably provided with a third connector device for connection of the third leg to the subsea consumer device or to an end supply cable that may further be connected to the subsea consumer device.

The first connector device, the second connector device and the third connector device may be of different types, but in a preferred embodiment at least one, but preferably each of the first connector device, the second connector device and the third connector device comprises a compression ferrule. The compression ferrules of the first connector device, the second connector device and the third connector device may be adapted for mechanical and/or electrical connection of the first conductor leg of the first leg to the conductor element of the first supply cable, the second conductor leg of the second leg to the conductor element of the second supply cable and the third conductor leg of the third leg directly to the subsea consumer device or to the conductor element of the end supply cable.

The first connector device, the second connector device and the third connector device preferably are each preferably provided with an insulation system, preferably a lapped insulation system. The insulation system covers the three joints that joins the three conductor legs of the conductor transition element to the conductor elements of the first supply cable, the second supply cable and the subsea consumer device or the end supply cable respectively.

The insulation system covering the joints is preferably similar to the insulation system provided on the conductor transition element. The insulation system, therefore, preferably comprises an inner layer of a semiconducting material, an outer layer preferably also of a semiconducting material, and an insulation layer that is arranged between the inner layer and the outer layer. The semiconducting material of the inner layer and the outer layer is preferably EPR (ethylene-propylene rubber), but other suitable semiconducting materials may be chosen if that is desired. The insulation layer is preferably made of cured, cross linked poly ethylene, although other suitable insulating materials may be chosen if that is desired.

For conduction of the return current, the subsea cable comprises at least a first return cable and may preferably also comprise a second return cable, i.e. the subsea cable comprises at least two return cables for the electric current.

The conductor transition element is preferably attached to a support element that is attached to the pipeline. The support element preferably comprises a substantially flat part on which the conductor transition element is securely arranged.

In an embodiment of the present invention, the subsea consumer device may be a pipeline and the subsea cable system may further comprise an end supply cable that is connected to the third leg of the conductor transition element and to the pipeline. The end supply cable is preferably a piggyback cable which is mechanically and electrically connected to the pipeline.

The piggyback cable is preferably mechanically and electrically connected to a second end portion of the pipeline and the at least one return cable is preferably mechanically and electrically connected to a first end of the pipeline whereby the pipeline can be heated by an electric current passing through the pipeline due to resistive heat being produced in the pipeline as the electric current is passing through it. The subsea cable system thereby provides the necessary electric current for direct electrical heating of the pipeline. The first end portion of the pipeline and the second end portion of the pipeline is therefore opposite ends of the pipeline, or opposite ends of the part of the pipeline that is being heated by direct electrical heating.

There is also provided a method for supplying electrical power to a subsea consumer device of electricity, the subsea consumer device being adapted for subsea use, wherein:
  a subsea cable, for example a subsea riser cable, comprising at least a first supply cable, a second supply cable and at least one return cable, is provided;
  a first end portion of the subsea cable is connected to a supply of electrical energy arranged on an offshore structure;
  the at least one return cable of the subsea cable is connected to the subsea consumer device at a second end portion of the subsea cable;
  at the second end portion of the subsea cable, the first supply cable is connected to a first conductor leg of a conductor transition element and the second supply cable is connected to a second leg of the conductor transition element;
  a third conductor leg of the conductor transition element is connected to the subsea consumer device.

In this way the subsea consumer device can be provided with electrical power.

The conductors of the first supply cable and the second supply cable are thereby combined into a single conductor that is providing electrical power to a subsea consumer device when the third leg of the conductor transition element is electrically connected to the subsea consumer device.

The third leg of the conductor transition element may be connected directly to the subsea consumer device. The connection of the third leg of the conductor transition element to the subsea consumer device is preferably done during the laying of the subsea cable and the subsea consumer device. Alternatively, the connection of the third leg of the conductor transition element to the subsea consumer device is done after the process of laying the subsea cable and the subsea consumer device have been carried out.

Alternatively, the third leg of the conductor transition element may be connected to an end supply cable that is further connected to the subsea consumer device. The connection of the end supply cable to the third leg of the conductor transition element and to the subsea consumer device is preferably done during the laying of the subsea cable and the subsea consumer device. Alternatively, the connection of the end supply cable to the third leg of the conductor transition element and to the subsea consumer device is done after the process of laying the subsea cable and the subsea consumer device have been carried out.

Preferably, at least one of the steps of the present method are carried out on one or more floating vessels before and/or during the laying of the subsea cable, the conductor transition element the subsea consumer device and possibly the end supply cable if such a cable is included for connection of the subsea consumer device to the conductor transition element. The remaining steps of the present method that are not carried out on the at least one floating vessel, are carried out subsea, preferably at the installation site subsea, and preferably by employing one or more remote operated vehicles (ROV).

Optionally, all steps of the present method are carried out on one or more floating vessels before and/or during the laying of the subsea cable, the conductor transition element, the subsea consumer device and possibly the end supply cable if such a cable is included for connection of the subsea consumer device to the conductor transition element, i.e. the different parts of the subsea cable system is connected to each other before it is being lowered from the at least one floating vessel into the sea.

This method is particularly useful for installing a subsea cable system as described herein. It should also be noted that the steps of the method listed above does not have to be carried out in the order that they are listed. For example, if one or more steps are carried out subsea, the order of the steps of the method listed above may change.

The consumer device may be a pipe or a pipeline or a section of a pipe or a pipeline and the end supply cable may typically be a piggyback cable mounted to the pipeline. However, the consumer device may also be a device other than a pipe or a pipeline such as a valve device or a subsea transformer that supplies electrical energy to other subsea devices.

The end supply cable and the at least one return cable are preferably electrically connected to the pipe or pipeline, or the section of the pipe or pipeline, to be heated at respective opposite end portions of the pipe or pipeline. For example an end supply cable in the form of a piggyback cable may be electrically connected to a second end portion of the pipeline and the at least one return cable may be electrically connected to a first end portion of the pipeline.

The conductor transition element is preferably mounted on a support element that is attached to the pipeline. As mentioned above, the support element may be provided with a substantially flat part on which the conductor transition element is securely arranged.

The conductor transition element is preferably a generally Y-shaped or T-shaped conductor transition element that comprises the first leg, the second leg and the third leg so that the conductor transition element can be electrically connected to the conductor elements of the first supply cable, the second supply cable and the end supply cable respectively.

The subsea cable may, in an embodiment, be provided with a first return cable and a second return cable. The first return cable and the second return cable are preferably electrically connected to the subsea consumer device, for example to the pipeline if the subsea consumer device is a pipeline.

The present subsea cable system, as described herein, is suitable for large water depths, typically for use in large water depths exceeding about 1000 m and also for use in ultra-deep waters that exceed about 3000 m. It should also be pointed out that the subsea cable may be a subsea riser cable or any other type of suitable subsea cable.

As already indicated above, the present subsea cable system described herein can be used for heating of a subsea pipe or pipeline or a section of a subsea pipe or pipeline. The heating typically takes place through direct electrical heating of the subsea pipe or pipeline or a section of a subsea pipe or pipeline.

Another use of the subsea cable system includes supply of electrical energy to an electrical subsea transformer that supply different types of subsea equipment, such as pumps and valve devices, with electrical energy. The subsea cable system may also be used to supply electrical energy to heat a plurality of subsea pipes or pipelines.

BRIEF DESCRIPTION OF THE DRAWINGS

The invention will now be explained with reference to a non-limiting example, with reference to the attached figures, in which.

DETAILED DESCRIPTION

Figure 1:
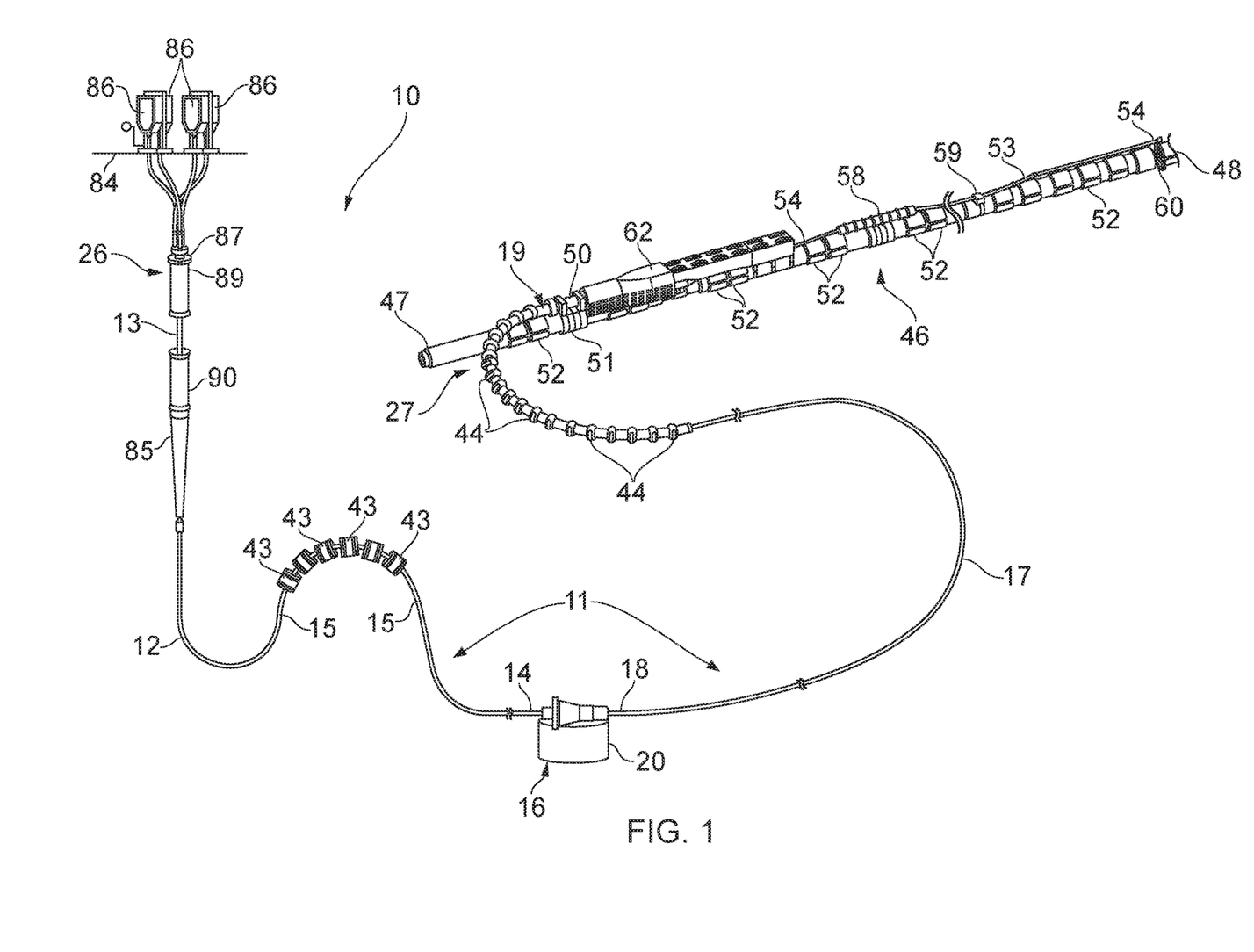
FIG. 1 illustrates a subsea cable system according to the present invention.

A subsea cable system 10 according to the present invention is shown in FIGS. 1-10 where FIG. 1 shows the complete system. In FIG. 1 a subsea cable 11 is shown that is connected to a floating structure comprising a deck 84 and a subsea consumer device 46 of electrical energy. The subsea cable 11 may be a subsea riser cable as indicated in the figures, or any other type of suitable subsea cable. The subsea cable comprises a dynamic subsea cable part 12 that is arranged so that it is, for the most part, floating submerged in the water, and a static subsea cable part 17 that is, for the most part, arranged on the seabed. An anchor device 16 is arranged at or near the seabed comprising a support part 20 for the subsea cable 11. A second end portion 14 of the dynamic subsea cable part 12 and a first end portion 18 of the static subsea cable part 17 are preferably joined on the support part 20 of the anchor device 16 as indicated in FIG. 1. It should be noted that even though the subsea cable 11 shown in the figures comprises a dynamic subsea cable part 12 and a static subsea cable part 17, the subsea cable does not have to comprise both parts. For example, the subsea cable 11 may be provided with a dynamic subsea cable part 12 only that is directly connected to the subsea consumer device 46.

The dynamic subsea cable part 12 comprises a first end portion 13, that is the same as the first end portion 26 of the subsea cable 11, that is connected to a floating structure that comprises a deck 84 or similar on which at least one, but preferably a plurality of top side junction boxes 86 are arranged.

In a known manner, the first end portion 26 of the subsea cable 11 may be provided with a hang-off arrangement 87 and a first guide tube 89 for the subsea cable 11. Preferably a second guide tube 90 and a bending stiffener 85 attached to the second guide tube 90 is provided to avoid excessive and potentially damaging bending of the subsea cable 11. The dynamic subsea cable part 12 may further be provided with one or more buoyancy elements 43 as indicated in FIG. 1, to obtain the desired shape of the dynamic subsea cable part 12 in the water.

In the embodiment of the present invention shown in the figures, the subsea consumer device is a part of a pipeline or a pipeline 46, but the subsea consumer device may also be other types of subsea equipment such as valve devices or subsea transformer devices.

The second end portion 27 of the subsea cable 11, which is also the second end portion (19) of the static subsea cable part 17, is fastened to a first end portion 47 of the subsea pipeline 46.

As shown in FIG. 1, the second end portion 27 of the subsea cable 11 may further be provided with one or more bending restrictors 44 to prevent excessive bending of the subsea cable 11 and thereby potential damage to the subsea cable 11.

Figure 2:
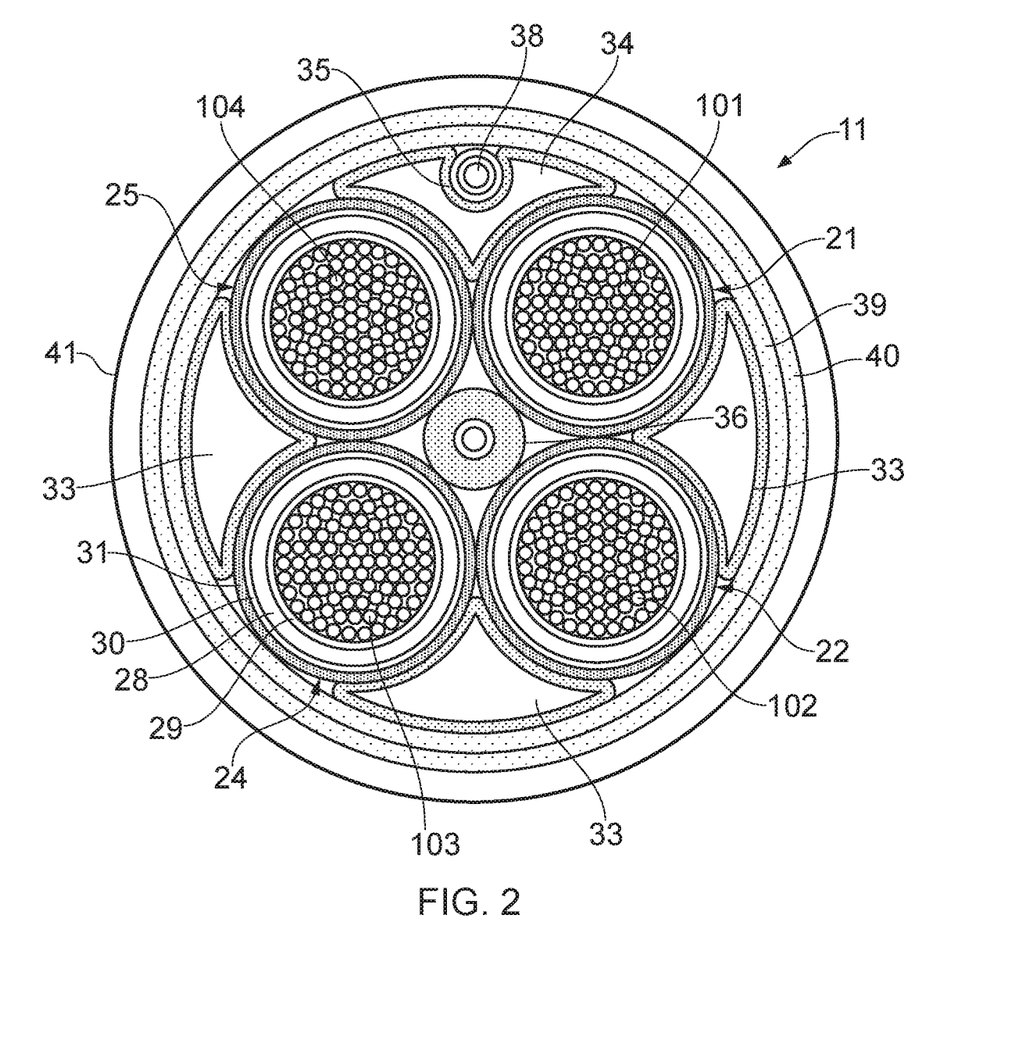
FIG. 2 illustrates a cross-section of a subsea cable of the subsea cable system.

In FIG. 2, a cross section of a subsea cable 11 according to the present invention is shown. The subsea cable 11 in FIG. 2 is provided with a first supply cable 21 and a second supply cable 22 that supply electrical energy from top side junction boxes 86 on the floating structure to the pipeline 46 for direct electrical heating of the pipeline 46. The subsea cable 11 shown in FIG. 2 is also provided with a first return cable 24 and a second return cable 25 for the return current from the pipeline 46 to the junction boxes 86 on the floating structure.

The first supply cable 21, the second supply cable 22, the first return cable 24 and the second return cable 25 may have the same design as indicated in FIG. 2, but may obviously have different designs if that is desired. The two supply cables, 21, 22 and the two return cables 24, 25 shown in FIG. 2 are therefore described only once herein.

The cables 21, 22, 24, 25 comprise respective conductor elements 101, 102, 103, 104 that conducts the electric current. The conductor elements 101, 102, 103, 104 preferably have a substantially circular shape in a cross-sectional view as indicated in FIG. 2, but may be provided with different shapes if that is considered advantageous. The conductor elements 101, 102, 103, 104 may be made of any suitable material that has sufficient strength and is capable of conducting the electric current. For example, the conductor elements 101, 102, 103, 104 may be made of copper or aluminium, or a copper alloy or an aluminium alloy. As indicated in FIG. 2, the conductor elements 101, 102, 103, 104 may in a known manner comprise a plurality of strands that together form the conductor element.

The supply and return cables 21, 22, 24, 25 are each further provided with a first layer 29 that is arranged around respective conductor elements 101, 102, 103, 104, radially on the outside of the conductor elements 101, 102, 103, 104. The first layer 29 of the supply and return cables 21, 22, 24, 25 can be made of cross linked polyethylene (XLPE) or any other suitable material.

The supply and return cables 21, 22, 24, 25 are also each provided with a second layer 28 that is arranged around respective first layers 29, radially on the outside of the first layers 29. The second layer 28 of the supply and return cables 21, 22, 24, 25 can be made of cross linked polyethylene (XLPE) or any other suitable material.

The supply and return cables 21, 22, 24, 25 are each further provided with a third layer 30 that is arranged around respective second layers 28, radially on the outside of the second layers 28. The third layer 30 of the supply and return cables 21, 22, 24, 25 can be made of cross linked polyethylene (XLPE) or any other suitable material.

The supply and return cables 21, 22, 24, 25 are each further provided with an outer sheath 31 that is arranged around respective third layers 30, radially on the outside of the third layers 30. The outer sheath 31 of the supply and return cables 21, 22, 24, 25 can be made of polyethylene (PE) or any other suitable material.

It should be mentioned that this is one possible design of the first supply cable 21, the second supply cable 22, the first return cable 24 and the second return cable 25, but the supply and return cables 21, 22, 24, 25 may obviously be provided with fewer layers or more layers and the conductor elements 101, 102, 103, 104 and the various layers 28, 29, 30 may be made of other materials than given above as required for any given application of the subsea cable 11.

Around the first supply cable 21, the second supply cable 22, the first return cable 24 and the second return cable 25, a plurality of layers 39, 40, 41 are arranged. These can be different types of layers, but at least one of the layers will be an armouring layer that will provide strength to the subsea cable 11 and protect the first supply cable 21, the second supply cable 22, the first return cable 24 and the second return cable 25 and any other cables provided within the subsea cable 11 from getting damaged.

The embodiment of the subsea cable 11 shown in FIG. 2 comprises at least a first armouring layer 39 and a second armouring layer 40 that is arranged around the first armouring layer 39, radially on the outside of the first armouring layer 39. The first armouring layer 39 and the second armouring layer 40 may, for example, be made of galvanized steel, but any other suitable material that can provide sufficient strength and is sufficiently resistant to corrosion may be chose for the armouring layers 39, 40.

The subsea cable 11 further comprises at least one outer sheath 41 that is arranged around the second armouring layer 40, radially on the outside of the second armouring layer 40. The outer sheath 41 may, for example, be made of polyethylene (PE) or polypropylene yarn, but also other materials that are suitable may be chosen as outer sheath material.

It should be noted that the subsea cable 11 may be provided with fewer or more layers surrounding the first supply cable 21, the second supply cable 22, the first return cable 24 and the second return cable 25 than what is shown in FIG. 2.

To keep the first supply cable 21, the second supply cable 22, the first return cable 24 and the second return cable 25 in their positions within the subsea cable 11, the subsea cable 11 is provided with a plurality of filler elements that at least partially fill the void between the first supply cable 21, the second supply cable 22, the first return cable 24 and the second return cable 25 and the armouring layers 39, 40.

A first filler element 33 is arranged in the void between the first supply cable 21, the second supply cable 22 and the first armouring layer 39, between the second supply cable 22, the first return cable 24 and the first armouring layer 39, and between the first return cable 24, the second return cable 22 and the first armouring layer 39 as shown in FIG. 2.

Between the first supply cable 21, the second return cable 25 and the first armouring layer 39 there is provided a second filler element 34. The second filler element 34 has substantially the same shape as the first filler elements 33, but is further provided with a cavity 35 extending in the longitudinal direction of the filler element 34 and the subsea cable 11. In the cavity 35, for example a fibre optical cable 38 may be arranged that can be used to send and receive signals from any sensor and control device that the subsea cable system 10 may be provided with. It would also be possible to provide the first filler elements 33 with similar cavities if a number of fibre optical cables or other types of cables are to be included in the subsea cable 11.

In the middle of the subsea cable 11, between the first supply cable 21, the second supply cable 22, the first return cable 24 and the second return cable 25, a third filler element 36 is provided as shown in FIG. 2, in order to further help keeping the cables 21, 22, 24, 25 in their respective positions within the subsea cable 11.

Figure 4:
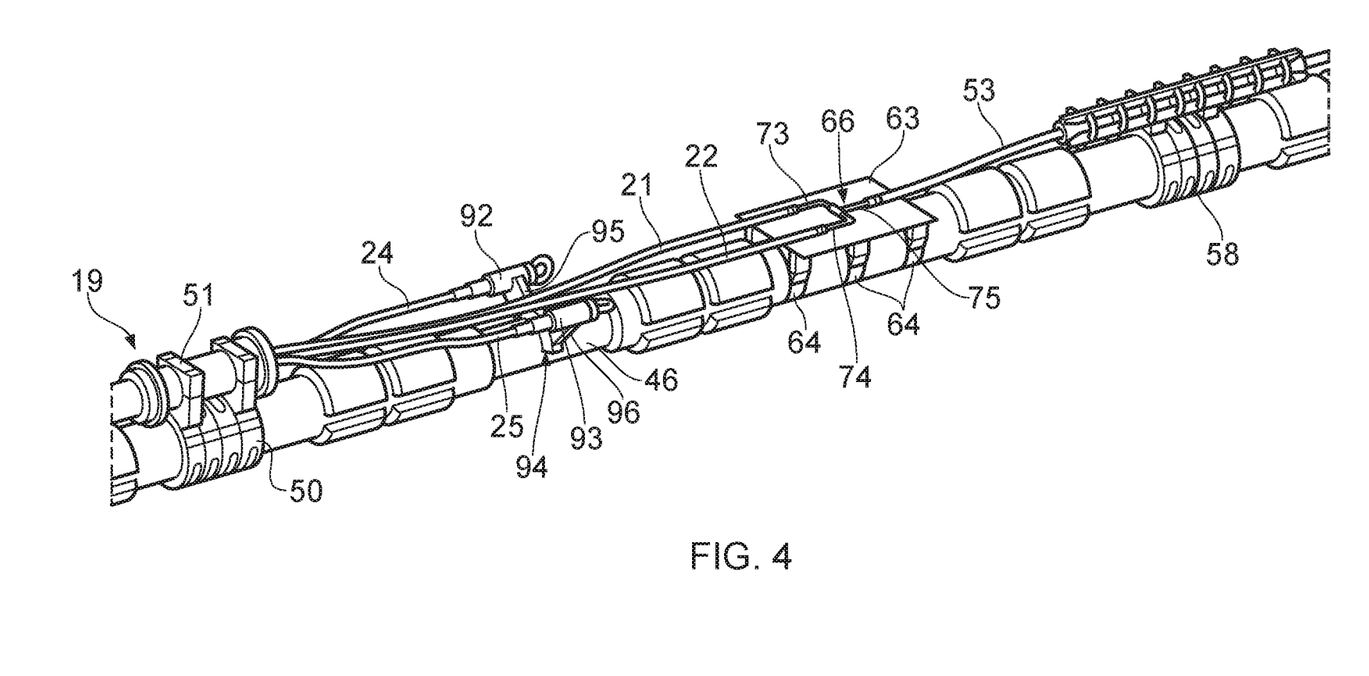
FIG. 4 illustrates a part of a pipeline in FIG. 1 to which the subsea cable connected for direct electric heating of the pipeline.
Figure 5:
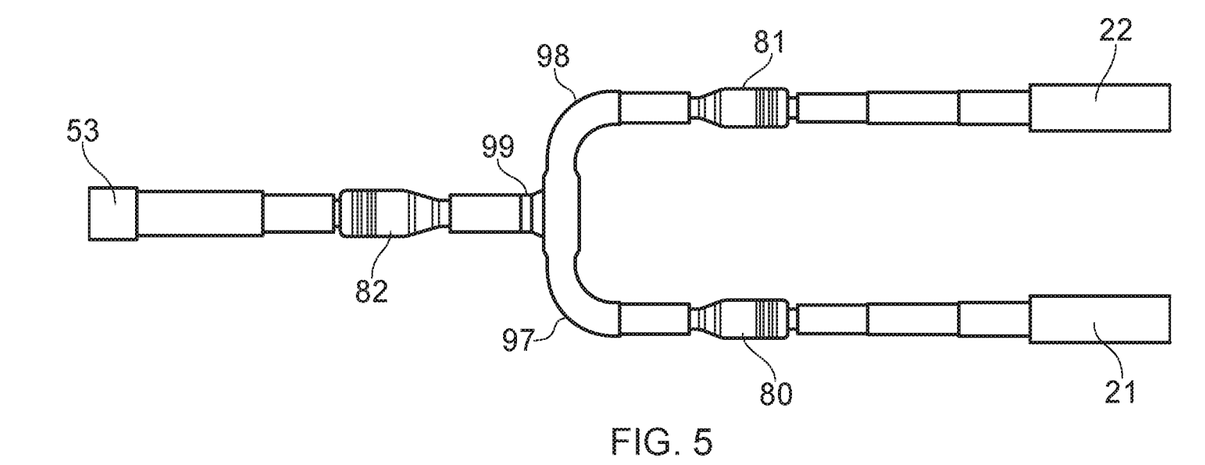
FIG. 5 illustrates the conductor transition element in FIG. 3 where the insulation of the first joint, the second joint and the third joint have been removed and the first connector, the second connector and the third connector are visible.
Figure 6:
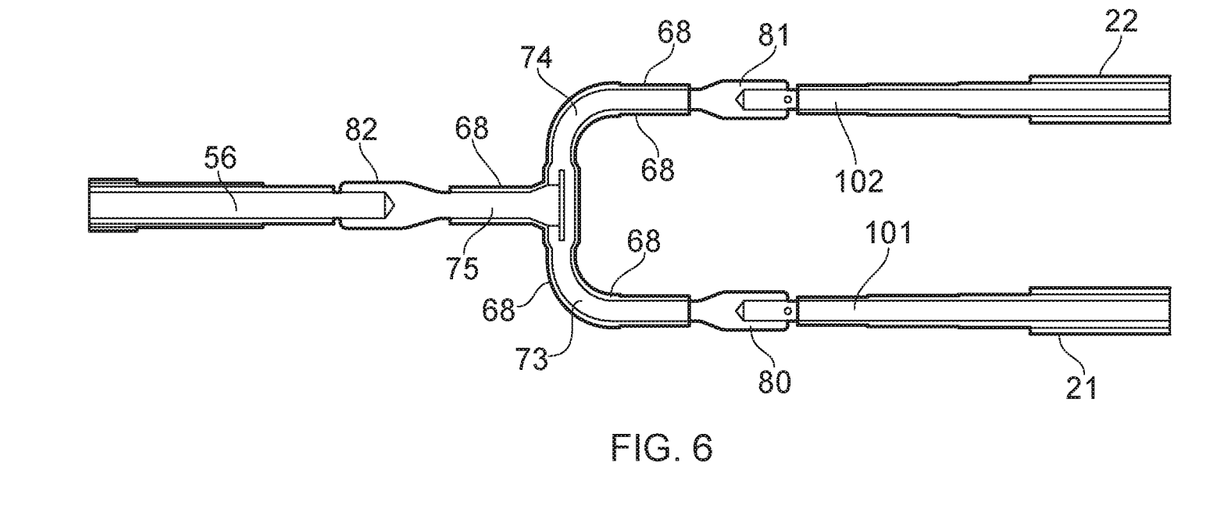
FIG. 6 illustrates a longitudinal section through the conductor transition element shown in FIG. 3.

In FIG. 4, there is shown an enlarged view of the section of the pipeline 46, as shown in FIG. 1, to which the subsea cable system 10 is connected and thereby heating the pipeline 46 by direct electric heating. As indicated in FIG. 4, the end portion 19 of the subsea cable 11 is attached to an armour block 50 that is attached to the pipeline 46 with a pipeline clamp 51.

The first supply cable 21 and the second supply cable 22 extends from the armour block 50 to a conductor transition element 66 that is mounted to a generally flat surface of the support element 63. The support element 63 is securely attached to the pipeline 46 with one or more fastening elements 64.

The conductor transition element 66 is provided with three legs, a first leg 97, a second leg 98 and a third leg 99, and is preferably given a Y-shaped form as indicated in the figures or alternatively a more T-shaped form. As is clearly shown in FIG. 3, the first supply cable 21 is connected to the first leg 97 of the conductor transition element 66 in a first joint 77 and the second supply cable 22 is connected to the second leg 98 of the conductor transition element 66 in a second joint 78.

Figure 3:
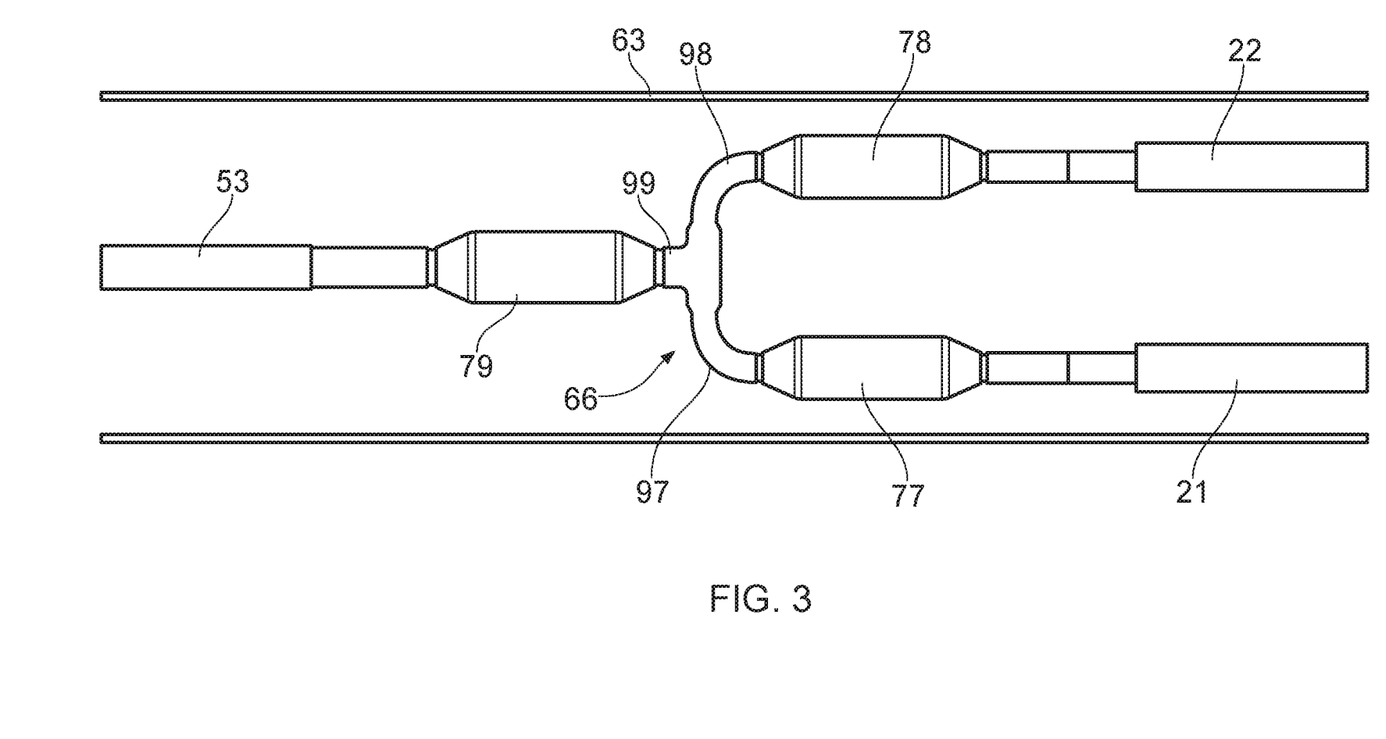
FIG. 3 illustrates a conductor transition element with a first leg, a second leg and a third leg arranged on a support element where the first leg of the transition element is connected to a first supply cable in a first joint, the second leg of the transition element is connected to a second supply cable in a second joint, and the third leg of the transition element is connected to an end supply cable in a third joint.

As can be further seen on FIG. 3, the third leg 99 of the conductor transition element 66 is connected to an end supply cable 53 which, in this embodiment of the invention, is a piggyback cable 53, in a third joint 79.

The piggyback cable 53 is attached to the pipeline 46 with at least one piggyback cable clamp 58 and at least one saddle strap 59 as shown in FIG. 4.

The piggyback cable 53 is terminated at a second end portion 48 of the pipeline 46 where the piggyback cable 53 in a known manner is attached to the second end portion 48 of the pipeline 46 with a termination arrangement 60 such that the piggyback cable is electrically connected to the second end portion 48 of the pipe line 46.

The first return cable 24 extends from the armour block 50 and is provided with a first termination element 92 at its end. The first termination element 92 is mechanically and electrically attached to a first collector arm 95. Similarly, the second return cable 25 extends from the armour block 50 and is provided with a second termination element 93 at its end. The second termination element 93 is mechanically and electrically attached to a second collector arm 96. The first collector arm 95 and the second collector arm 96 are both mechanically and electrically connected to a collector device 94 that is mechanically and electrically connected to the first end portion 47 of the pipeline 46. The first return cable 24 and the second return cable 25 are thereby electrically connected to the pipeline 46 and the electric current that is conducted through the pipeline 46 from the termination arrangement 60 of the piggyback cable 53 to the collector device 94 can thereby flow back to the top side junction boxes 86 on the deck 84 of the floating structure through the first return cable 24 and the second return cable 25.

As shown in FIG. 1, the first supply cable 21, the second supply cable 22, the conductor transition element 66, the first return cable 24, the second return cable 25 are covered by a protection cover 62 in a manner well known in the art.

As further indicated in FIG. 1, the pipeline 46 may, in a conventional manner, be provided with at least one, but preferably a plurality of anodes to prevent corrosion of the pipeline 46 and/or the parts of the present subsea cable system 10 arranged on the pipeline 46.

The conductor transition element 66 and the joints 77, 78, 79 joining the first supply cable 21, the second supply cable 22 and the piggyback cable 53 to the conductor transition element 66 is shown in more detail in FIGS. 5-10.

As mentioned above, and as shown in FIGS. 3 and 5, the three-legged, preferably Y-shaped or alternatively T-shaped, conductor transition element 66 comprises a first leg 97 to which the first supply cable 21 is mechanically and electrically connected in a first joint 77, a second leg 98 to which the second supply cable 22 is mechanically and electrically connected in a second joint 77 and a third leg 99 to which the piggyback cable 53 is mechanically and electrically connected in a third joint 99.

As shown in FIG. 7-10, the conductor transition element 66 comprises a three-legged conductor element 67 that has the same Y-shape, or alternatively T-shape, as the conductor transition element itself. The conductor element 67 comprises a first conductor leg 73, a second conductor leg 74 and a third conductor leg 75.

The first conductor leg 73 is mechanically and electrically connected to the conductor element 101 of the first supply cable 21 with a first connector device 80. Similarly, the second conductor leg 74 is mechanically and electrically connected to the conductor element 102 of the second supply cable 22 with a second connector device 81. The third conductor leg 75 is mechanically and electrically connected to a conductor element 56 of the piggyback cable 53 with a third connector device 82.

The first connector device 80, the second connector device 81 and the third connector device 82 are preferably of the same type. The connector devices 80, 81, 82 may for example each comprise a compression ferrule. The compression ferrules of the first connector device 80, the second connector device 81 and the third connector device 82 are adapted for mechanical and electrical connection of the conductor element 101 of the first supply cable 21 to the first conductor leg 73, the conductor element 102 of the second supply cable 22 to the second conductor leg 74 and the conductor element 56 of the piggyback cable 53 to the third conductor leg 75 respectively. Two phases of an electric current, that is split in two phases on the floating structure, is thereby conducted through the first supply cable 21 and the second supply cable 22 of the subsea cable 11 and combined into a single phase conducted through the piggy back cable 53 as the electric current is passed through the conductor transition element 66.

It should be noted that in the embodiment of the present invention shown in the figures, the subsea cable 11 comprises two supply cables 21, 22 of the electric current, i.e. the electric current is split into two phases. It would, however, be possible to split the electric current into three or more phases by providing the subsea cable 11 with three or more supply cables and providing the conductor transition element 66 with a corresponding number of legs to which the supply cables would be connected plus a leg to which the subsea consumer device or the end supply cable, i.e. the piggy back cable 53, would be connected. The conductor transition element would therefore be fork-shaped instead of Y-shaped.

As shown in FIGS. 7-10, the conductor transition element 66 is preferably provided with an insulation system 68 comprising a plurality of layers as indicated in the figures. The conductor transition element 66 is preferably prefabricated with the insulation system 68.

In the embodiment of the conductor transition element 66 shown in FIGS. 5-10, the conductor transition element 66 is provided with an inner layer 69. The inner layer 69 is made of a semiconducting material. The semi-conducting material of the inner layer 69 may be made of, for example, EPR (ethylene-propylene rubber). Radially outside the inner layer 69, there is provided an insulation layer 70. The insulation layer 70 is preferably made of cured, cross linked polyethylene.

The insulation layer 70 may alternatively be semi-conductive. A semi-conductive insulation layer 70 may be obtained by mixing a portion of a conductive material, such as carbon black, into polyethylene in a manner known in the art.

Radially outside the insulation layer 70, there is provided an outer layer 71. The outer layer 71 is preferably also made of a semi-conducting material. Again, the semi-conducting material may be, for example, EPR (ethylene-propylene rubber).

As shown in FIG. 3, the joint 77, 78, 79 are also provided with insulation covering the first connector device 80, the second connector device and the third connector device 82. The insulation system covering the joints 77, 78, 79 is preferably the same as the insulation system 68 of the conductor transition system 66.

The first joint 77, the second joint 78 and the third joint 79 are therefore preferably provided with an insulation system that is the same as the insulation system 68. Referring to the FIGS. 7-9 that show the insulation system 68 in more detail, the insulation system of the first joint 77, the second joint 78 and the third joint 79 therefore comprises an inner layer 69 that is made of a semiconducting material. The semi-conducting material of the inner layer 69 may be made of, for example, EPR (ethylene-propylene rubber). Radially outside the inner layer 69, there is provided an insulation layer 70. The insulation layer 70 is preferably made of cured, cross linked polyethylene.

Figure 7:
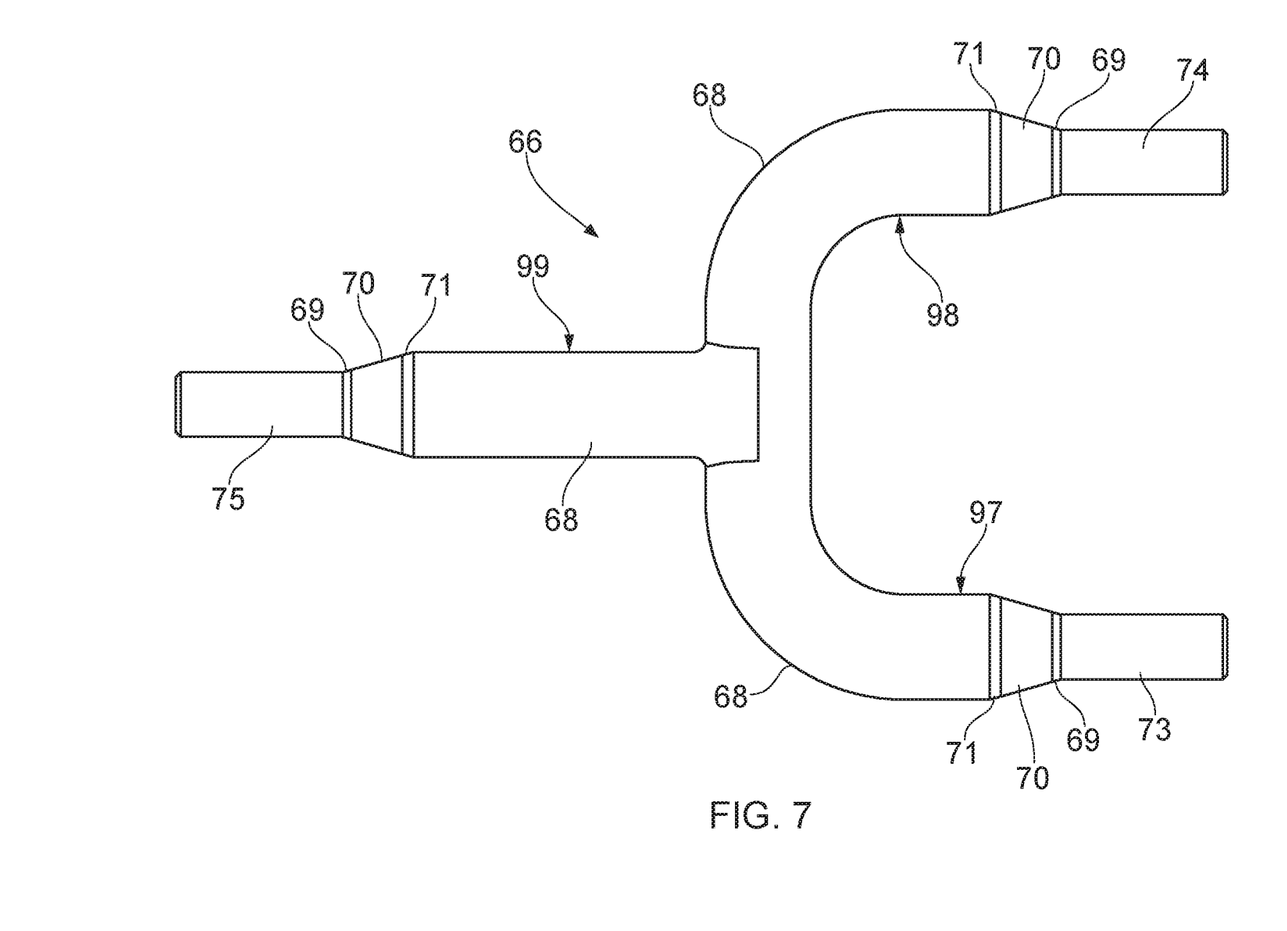
FIG. 7 illustrates a top view of the conductor transition element.
Figure 8:
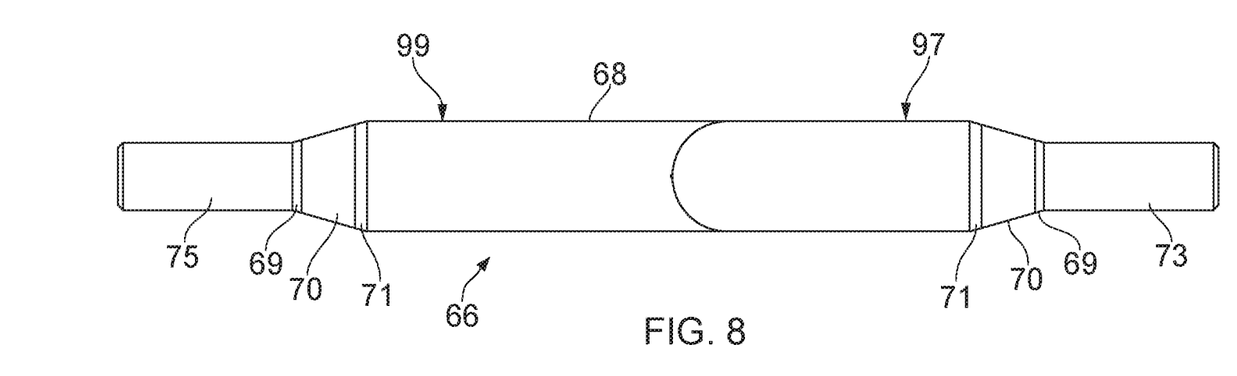
FIG. 8 illustrates a side view of the conductor transition element shown in FIG. 7.
Figure 9:
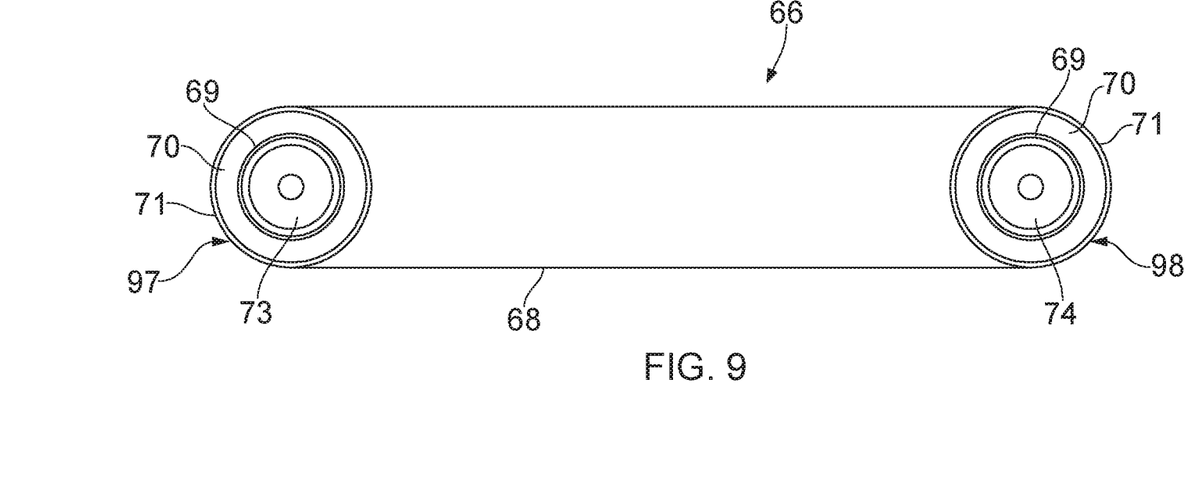
FIG. 9 illustrates a cross section of the conductor transition element shown in FIGS. 7 and 8 taken through the first leg and second leg of the conductor transition element.
Figure 10:
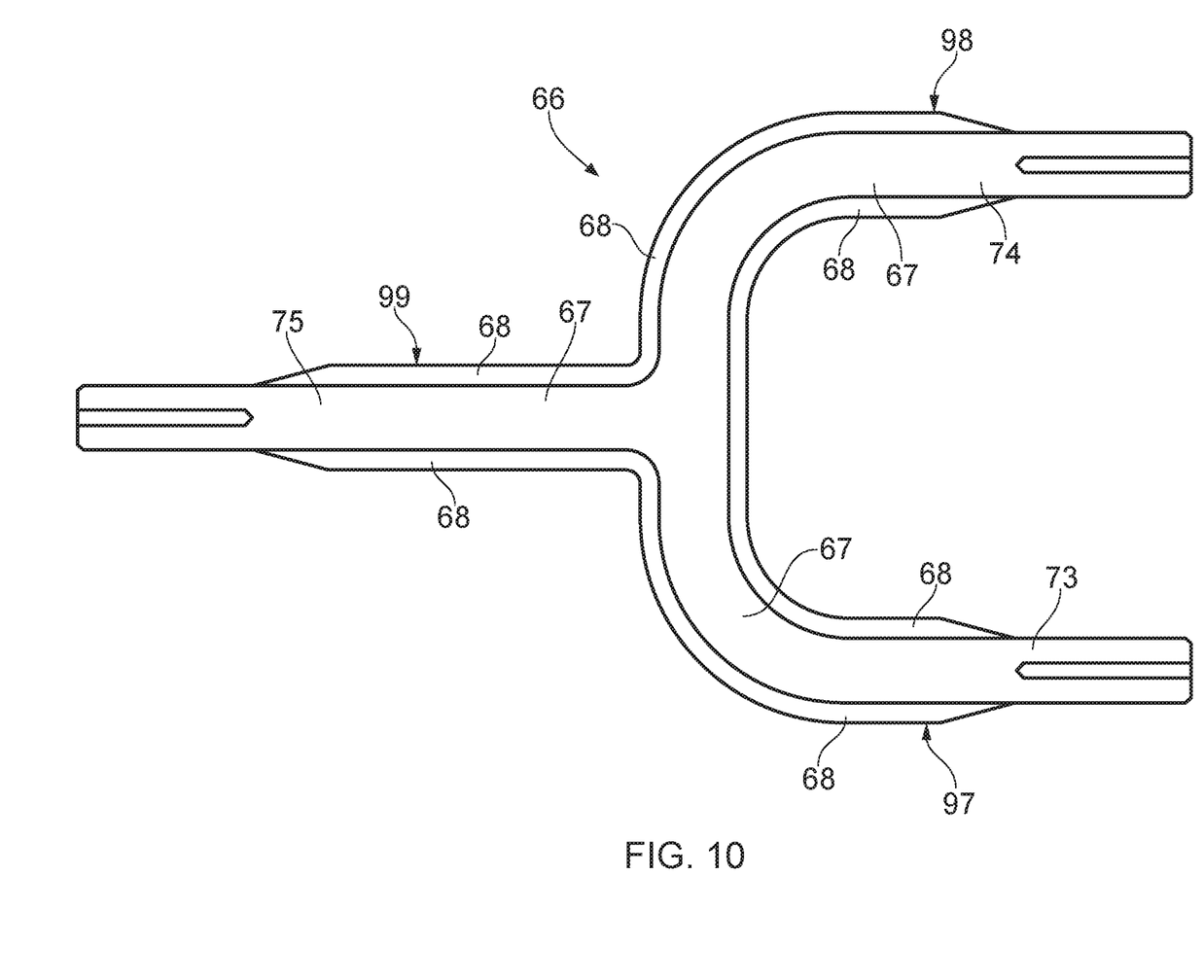
FIG. 10 illustrates a longitudinal section in a horizontal plane through the conductor transition element shown in FIGS. 7-9.

The insulation layer 70 may alternatively be semi-conductive. A semi-conductive insulation layer 70 may be obtained by mixing a portion of a conductive material, such as carbon black, into polyethylene in a manner known in the art.

Radially outside the insulation layer 70, there is provided an outer layer 71. The outer layer 71 is preferably also made of a semi-conducting material. Again, the semi-conducting material may be, for example, EPR (ethylene-propylene rubber).

The material used in the inner layer 69, the insulation layer 70 and the outer layer 71 of the insulation system of the first joint 77, the second joint 78 and the third joint 79, which is the same insulation system as the insulation system 68 of the conductor transition element 66, can be in the form of a tape that is self-amalgamating and that is wound around the first connector device 80, the first connector leg 73 and the conductor element 101 of the first supply cable 21 to form the first joint 77, around the second connector device 81, the second connector leg 74 and the conductor element 102 of the second supply cable 22 to form the second joint 78 and around the third connector device 82, the third connector leg 75 and the conductor element 56 of the piggy back cable 53 to form the third joint 79.

The self-amalgamating tape is preferably wound with an overlap for each turn, until a desired thickness of the respective layers of the first joint 77, the second joint 78 and the third joint 79 have been achieved.

To provide protection against water intrusion, a heat-shrinkable tubing may further by arranged over the insulation system of the first joint 77, the second joint 78 and the third joint 79, but the joints 77, 78, 79 will not be completely watertight.

The invention has now been explained with reference to a non-limiting example. A person skilled in the art will, however, appreciate that modifications and changes may be made to this embodiment which will be within the scope of the invention as defined in the following claims.

10 Subsea cable system
11 Subsea cable
12 Dynamic riser cable part
13 First end portion (dynamic riser part)
14 Second end portion (dynamic riser part)
15 Midsection
16 Anchor device
17 Static riser cable part (on the seabed)
18 First end portion (static riser part)
19 Second end portion (static riser part)
20 Support part (of anchor)
21 First supply cable
22 Second supply cable
23
24 First return cable
25 Second return cable
26 First end portion (Riser cable)
27 Second end portion (Riser cable)
28 Second layer (middle layer)
29 First layer (inner layer)
30 Third layer (outer layer)
31 Outer sheath (semi conducting)
32
33 First filler element
34 Second filler element
35 Cavity (in second filler element for fibre cable)
36 Third filter element -continued 37
38 Fibre cable
39 First armouring layer
40 Second armouring layer
41 Outer sheath
42
43 Buoyancy element (dynamic riser)
44 Bending restrictor (static riser)
45
46 Pipeline (subsea consumer device)
47 First end portion (of pipe line)
48 Second end portion (of pipe fine)
49
50 Armour block
51 Pipeline clamp
52 Anode
53 Piggyback cable (end supply cable)
54 First end portion (piggyback cable)
55 Second end portion (piggyback cable)
56 Conductor element (piggyback cable)
57
58 Piggyback cable clamp
59 Saddle strap (for piggyback cable)
60 Termination arrangement (for piggyback cable at far end of pipeline)
61
62 Protection cover (for Y-joint)
63 Support element (for Y-joint)
64 Fastening element (for support element)
65
66 Conductor transition element (Y-joint)
67 Conductor element (Y-shaped)
68 Insulation system (on Y-joint)
69 Inner layer
70 Insulation layer
71 Outer layer
72
73 First conductor leg (for first supply conductor)
74 Second conductor leg (for second supply conductor)
75 Third conductor leg (for piggyback cable)
76
77 First joint (on first conductor leg)
78 Second joint (on second conductor leg)
79 Third joint (on third conductor leg)
80 First connector device (on first conductor leg - for first supply conductor)
81 Second connector device (on second conductor leg - for second supply conductor)
82 Third connector device (on final conductor leg - for piggyback cable)
83
84 Deck (topside on platform etc)
85 Bending stiffener
86 Top side junction box (topside supply of electrical energy)
87 Hang-off arrangement
89 First guide tube
90 Second guide tube
91
92 First termination element (attached to end of first return conductor)
93 Second termination element (attached to end of second return conductor)
94 Collector device (collecting electric current passing though pipeline)
95 First collector arm (connected to first termination element)
96 Second collector arm (connected to second termination element)
97 First leg (of Y-joint)
98 Second leg (of Y-joint)
99 Third leg (of Y-joint)
100
101 Conductor element (First supply cable)
102 Conductor element (Second supply cable)
103 Conductor element (First return cable)
104 Conductor element (Second return cable)
105

The invention claimed is:

1. A subsea cable system for transfer of electric power to a subsea device, the subsea cable system comprising:
a subsea cable with a first end portion and a second end portion where the first end portion is adapted for connection to a supply of electrical energy, the subsea cable comprising three portions of at least a first supply cable, a second supply cable, and at least one return cable,
the first supply cable, the second supply cable, and the at least one return cable each comprising a conductor element for conduction of an electric current,
the subsea cable system further comprising a subsea conductor transition element comprising a conductor element that is provided with at least a first conductor leg, a second conductor leg and a third conductor leg where the first conductor leg is connected to the conductor element of the first supply cable, the second conductor leg is connected to the conductor element of the second supply cable and the third conductor leg is connectable to a subsea consumer device.

2. The subsea cable system according to claim 1, wherein the conductor transition element is generally Y-shaped or T-shaped and comprises a first leg that includes the first conductor leg, a second leg that includes the second conductor leg and a third leg that includes the third conductor leg.

3. The subsea cable system according to claim 1, wherein the conductor transition element is provided with an insulation system comprising at least an inner layer, an outer layer and an insulation layer that is arranged between the inner layer and the outer layer.

4. The subsea cable system according to claim 3, wherein the inner layer is made of a semi-conducting material, the insulation layer is made of cured, cross linked poly ethylene and the outer layer is made of a semi-conducting material.

5. The subsea cable system according to claim 1, wherein the first leg of the conductor transition element is provided with a first connector device for connection of the first supply cable to the first leg, the second leg of the conductor transition element is provided with a second connector device for connection of the second supply cable to the second leg and the third leg of the conductor transition element is provided with a third connector device for connection of the subsea consumer device to the third leg.

6. The subsea cable system according to claim 5, wherein the first connector device, the second connector device and the third connector device each comprise compression ferrules.

7. The subsea cable system according to claim 6, wherein the compression ferrules of the first connector device, the second connector device and the third connector device are adapted for mechanical and/or electrical connection of the conductor element of the first supply cable to the first conductor leg of the first leg, the conductor element of the second supply cable to the second conductor leg of the second leg and the subsea consumer device to the third conductor leg of the third leg respectively.

8. The subsea cable system according to claim 5, wherein the first connector device, the second connector device and the third connector device are each provided with an insulation system.

9. The subsea cable system according to claim 1, wherein the subsea cable comprises at least a first return cable and a second return cable for the return current.

10. The subsea cable system according to claim 1, wherein the subsea consumer device is a pipeline and the subsea cable system further comprises an end supply cable that is connected to the third leg of the conductor transition element and to the pipeline.

11. The subsea cable system according to claim 10, wherein the conductor transition element is attached to a support element that is attached to the pipeline.

12. The subsea cable system according to claim 10, wherein the piggyback cable is electrically connected to a second end portion of the pipeline and the at least one return cable is electrically connected to a first end portion of the pipeline whereby the pipeline can be heated by an electric current passing through the pipeline.

13. A subsea cable, said subsea cable having a subsea cable system according to claim 1.

14. A method for supplying electrical power to a subsea consumer device of electricity, the subsea consumer device being adapted for subsea use, wherein said method comprising the steps of:
providing a subsea cable comprising three portions of at least a first supply cable, a second supply cable and at least one return cable;
a first end portion of the subsea cable is connected to a supply of electrical energy arranged on an offshore structure;
the at least one return cable of the subsea cable is connected to the subsea consumer device at a second end portion of the subsea cable;
at the second end portion of the subsea cable, the first supply cable is connected to a first conductor leg of a subsea conductor transition element and the second supply cable is connected to a second conductor leg of the conductor transition element;
a third conductor leg of the conductor transition element is connected to the subsea consumer device; whereby the subsea consumer device can be provided with electrical power.

15. The method according to claim 14, wherein at least one of the steps are carried out on one or more floating vessels before and/or during the laying of the subsea cable, the conductor transition element and the subsea consumer device.

16. A subsea cable, said subsea cable being heated according to said method as claimed in claim 14.

* * * * *